United States Patent [19]

Kaneko et al.

[11] Patent Number: 4,629,311
[45] Date of Patent: Dec. 16, 1986

[54] AUTOMATIC DOCUMENT FEEDER

[75] Inventors: Tamaki Kaneko, Fujisawa; Kunio Hibi, Yokohama, both of Japan

[73] Assignee: Ricoh Company, Ltd., Japan

[21] Appl. No.: 587,141

[22] Filed: Mar. 7, 1984

[30] Foreign Application Priority Data

Mar. 8, 1983 [JP] Japan ................... 58-36670

[51] Int. Cl.⁴ .................. G03G 15/04; G03G 21/00
[52] U.S. Cl. .................. 355/14 SH; 271/258; 355/3 SH
[58] Field of Search ............. 355/3 R, 3 SH, 14 SH; 271/3.1, 258

[56] References Cited

U.S. PATENT DOCUMENTS 4,076,408 2/1978 Reid et al. .................. 271/258 X
4,248,528 2/1981 Sahay .................. 271/3.1 X Primary Examiner—Fred L. Braun
Attorney, Agent, or Firm—Guy W. Shoup

[57] ABSTRACT

An automatic document feeder of an electrophotographic copying apparatus includes a feeding tray, a device for feeding to an exposing station one document sheet after another from a stack of document sheets piled on the feeding tray by starting with the lowermost document sheet of the stack, and a device for returning the document sheets to the feeding tray and placing same on the uppermost document sheet of the stack after the document sheets have been treated for exposure. The automatic document feeder further includes a sensor for sensing that a job sheet is disposed beneath the lowermost document sheet of the stack of document sheets on the feeding tray. The job sheet is placed beneath the lowermost sheet of the stack of a series of document sheets piled on the feeding tray by successively stacking the document sheets with the first document sheet of the series constituting the lowermost document sheet of stack or placed over the uppermost document sheet of the stack which is constituted by the last document sheet of the series, and has a mark on its surface for controlling the automatic document feeder and a main body of the copying apparatus.

2 Claims, 1 Drawing Figure

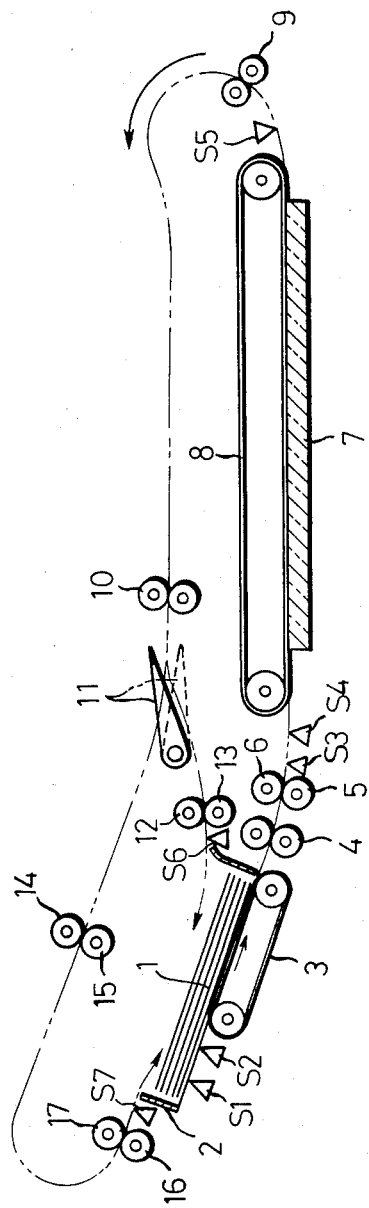

AUTOMATIC DOCUMENT FEEDER

BACKGROUND OF THE INVENTION

This invention relates to an automatic document feeder suitable for use with an electrophotographic copying apparatus for automatically feeding to an exposing station one document sheet after another from a stack of document sheets piled on a feeding tray by starting at the lowermost document sheet of the stack and returning the document sheets to the stack on the feeding tray and placing them on uppermost document sheet of the stack after the document sheets have been treated for exposure.

When a document consisting of a series of document sheets of several pages is copied by an electrophotographic copying apparatus, it is troublesome to repeatedly perform the operation of placing one document sheet on a contact glass member, setting a pressing plate thereon, removing the document sheet after it has been treated for exposure and replacing the illuminated document sheet for exposure by another document sheet of the next following page. To eliminate the need for the operator to perform this troublesome operation, proposals have been made to use an automatic document feeder which automatically feeds one document sheet after another from a stack of document sheets on a feeding tray and automatically ejects document sheets that have been treated for exposure.

When a document consisting of a multiplicity of document sheets of several pages is copied to produce a plurality of copies of the document, it is usual practice to place one document sheet on the contact glass member and produce a desired number of copies of the document sheet and repeat the same operation, until all the document sheets have been treated. The copies of the document sheets produced by the aforesaid operation and ejected from the copying apparatus are sorted either manually or by using a sorter to produce a desired number of copies of the document each copy consisting of copies of the document sheets arranged in the order of pages. In the automatic document feeder described hereinabove, the time required for feeding a document sheet to a predetermined position in an exposing station is short and substantially as long as the time required for a scanner to be restored to its original position. Therefore, if only one copy is produced each time one document sheet is fed to the exposing station and this is repeated until a copy each of all the document sheets is produced, then it is possible to produce a required number of copies of the document each copy consisting of copy sheets of the document sheets arranged in the order of pages merely by repeating the aforesaid operation a number of times corresponding to the desired number of copies of the document to be produced while eliminating the need to perform the operation of sorting the copies in the order of pages.

When this operation is performed, it will be possible to produce the required number of copies of the document by repeatedly feeding and returning the document sheets a number of times corresponding to the required number of copies of the document, if one document sheet after another is fed from the feeding tray by starting at the lowermost document sheet of the stack to the exposing station and the document sheets are returned to the feeding tray and placed on the uppermost document sheet of the stack after exposing is finished.

This type of automatic document feeder is known and disclosed in Japanese Patent Publication No. 56-467 corresponding to (U.S. patent application Ser. No. 671,867, filed Mar. 30, 1976) and Japanese Patent Publication No. 56-40338 corresponding to (U.S. patent application Ser. No. 523,610, filed Nov. 13, 1974), for example.

When a plurality of copies of a document consisting of a series of document sheets of continuously numbered pages are produced by using this type of automatic document feeder, it is necessary to monitor the feeding of the document sheets to the exposing station to determine how many number of times the document sheets have been fed to the exposing station and returned therefrom. To this end, the automatic document feeder disclosed in the Japanese patent publications referred to hereinabove is provided with a partition plate inserted into the feeding tray across the rear wall. A series of document sheets piled in a stack in which the first page of the series forms the lowermost document sheet and the next following pages are piled thereon in an orderly manner are initially placed on the feeding tray in such a manner that the partition plate is placed on the document sheet or the last page of the series. The document sheets are successively fed to the exposing station from the feeding tray by starting at the lowermost document sheet or the first page of the series and returned to the feeding tray, and when all the document sheets have been fed and no document sheet is left under the partition plate, the partition plate is detected by a sensor and a document sheet feeding completion signal is produced. When only one copy each of the series of document sheets is produced, the automatic document feeder is rendered inoperative by this signal. When a plurality of copies are produced, the partition plate is withdrawn from below the stack of document sheets when this signal is produced and placed on top of the stack of document sheets again. This operation is repeated a number of times corresponding to the desired number of copies to be obtained, so that the automatic document feeder is rendered inoperative after a predetermined number of copies of the document have been produced following sensing of the partition plate a predetermined number of times.

In the automatic document feeder of the aforesaid construction, a mechanism of complex construction should be provided for moving the partition plate each time the operation of feeding the series of document sheets to the exposing station is finished. Also, means should be provided for the operator to input to automatic document feeder data on the number of copies to be produced and whether only one surface or both surfaces of each document sheet should be copied.

SUMMARY OF THE INVENTION

This invention has been developed for the purpose of obviating the aforesaid disadvantages of the prior art. Accordingly, the invention has as its object the provision of an automatic document feeder suitable for use with an electrophotographic copying apparatus which is simple in construction and high in reliability and can be readily controlled in automatically performing a plurality of number of times the operation of feeding from a stack of document sheets placed on a feeding tray to an exposing station and returning therefrom to the feeding tray one document sheet after another by starting with the lowermost document sheet of the stack to produce a plurality of number of copies of a document.

The outstanding characteristic of the automatic document feeder according to the invention is that it includes a sensor for sensing that a job sheet is disposed beneath the lowermost document sheet of the stack of document sheets on the feeding tray. The job sheet is placed beneath the lowermost sheet of the stack of a series of document sheets piled on the feeding tray by successively stacking the document sheets with the first document sheet of the series constituting the lowermost document sheet of the stack or placed over the uppermost document sheet of the stack which is constituted by the last document sheet of the series, and has a mark on its surface for controlling the automatic document feeder and a main body of the copying apparatus.

The use of the job sheet according to the invention eliminates the need to use the partition plate and means for moving the same which are used with the document feeder of the prior art, thereby making it possible to render the automatic document feeder simple in construction and low in cost.

If data on the number of copies to be made and whether one side or both sides of the document sheets should be copied is stored on the job sheet for controlling the document feeding operation, it is possible to eliminate the need to additionally provide an input device for controlling the document feeder by initially placing the job sheet beneath the lowermost document sheet of a stack of document sheets on the feeding tray and using sensor means for monitoring the data on the job sheet to control the operation of not only the document feeder but also a main body of the copying apparatus by signals produced by the sensor means, thereby simplifying the control mechanism and enabling control to be readily effected.

BRIEF DESCRIPTION OF THE DRAWING

A single drawing FIGURE is a fragmentary section view of the automatic document feeder comprising one embodiment of the invention, showing the feeding tray, document sheet conveying path and document sheet conveying members located along the document sheet conveying path while removing the housing and drive means of the automatic document feeder.

DESCRIPTION OF THE PREFERRED EMBODIMENT

A preferred embodiment of the invention will now be described by referring to the single drawing FIGURE.

A series of document sheets 1 piled in a stack are placed on a feeding tray 2 beneath which a pickup belt 3 is located with its top surface contacting the lowermost document sheet of the stack of document sheets 1 on the feeding tray 2 for picking up one document sheet after another. A pair of separation rollers 4 and a pair of pinch rollers 5 and 6 are located on a path of travel of the document sheets betweeen the feeding tray 2 and a contact glass member 7 located on a top surface of a main body of a copying apparatus. A conveyor belt 8 of a large width is located over a top surface of the contact glass member 7 in such a manner that a bottom surface of a lower run of the conveyor belt 8 is maintained in contact with the top surface of the contact glass member 7. A pair of discharge rollers 9 are located at a discharge end of the contact glass member 7, and the path of travel of the document sheets makes a U-turn at the discharge rollers 9 to extend above the conveyor belt 8. A pair of feed rollers 10 are located on the path of travel of the document sheets adjacent the pair of discharge rollers 9, and a gate 11 is located adjacent the feed rollers 10 for selectively moving the document sheets through a path for returning the document sheets to the feeding tray 2 from its forward end and a path making another U-turn and returning the document sheets to the feeding tray 2 from its rearward end. A pair of inverted document sheet release rollers 12 and 13 are located at a discharge end of the former path, and a pair of intermediate rollers 14 and 15 of feeder section and a pair of return rollers 16 and 17 are located between opposite ends of the latter path and at a discharge end thereof, respectively.

A job sheet sensor S1 and a sensor S2 for sensing whether or not document sheets are present on the feeding tray 2 are located on a bottom surface of the feeding tray 2, and a sensor S3 for rendering the pickup belt 3 and separation rollers 4 inoperative and a sensor S4 for sensing a leading end of a document sheet for causing same to stop in a predetermined position on the contact glass member 7 are located in a portion of the path of movement of the document sheets between the pinch rollers 5 and 6 and conveyor belt 8. A sensor S5 for sensing that a document sheet has been discharged from an exposing station is located between a discharge end of the conveyor belt 8 on the contact glass member 7 and the discharge rollers 9. Sensors S6 and S7 for sensing that a document sheet has been discharged on to the feeding tray 2 are located posterior to the inverted document sheet release rollers 12 and 13 on the path for returning the document sheets to the feeding tray 2 from its forward end and posterior to the return rollers 16 and 17 located on the path for returning the document sheets to the feeding tray 2 from its rearward end, respectively.

Operation of producing one copy and a plurality of copies of a document consisting of a series of document sheets having continuously numbered pages will be described.

First, data as to whether each document sheet has an image on either side or only on one side and what the desired number of copies to be produced is inputted to a control unit of the document feeder.

Then, a job sheet is placed on the uppermost document sheet of a stack of document sheets successively piled on the feeding tray 2 with their top surfaces facing downwardly by starting with the document sheet of the first page serving as the lowermost sheet of the stack. The job sheet is a sheet of the same size as the document sheets and conveyed through the path of travel of the document sheets, but it is distinct from the document sheets in that it has a special code or mark on its surface which is sensed by a sensor and the sensor sensing the job sheet produces a signal for controlling the document feeder and the main body of the copying apparatus. In the embodiment shown and described hereinabove, the job sheet is intended to perform the function of the partition plate described in the background of the invention with reference to the prior art and has applied thereto in a position corresponding to the sensor S1 on the bottom surface of the feeding tray 2 a piece of aluminum foil or a coat of a paint of a specific reflective index which is sensed by the sensor S1 when the job sheet is located on the feeding tray 2 beneath the lowermost document sheet of the stack.

When a command to start copying is given, the lowermost document sheet of the stack of document sheets on the feeding tray 2 is picked up by the pickup belt 3 and fed to the separation rollers 4 which separates the lowermost document sheet from other document sheets that might inadvertently be adhering thereto, so that only the lowermost document sheet is positively fed to the pinch rollers 5 and 6. As the document sheet is fed forwardly by the pinch rollers 5 and 6, it is sensed by the sensor S3 which produces a signal to render the pickup belt 3 and separation rollers 4 inoperative. When a leading end of the document sheet is sensed by the sensor S4, the conveyor belt 8 is driven to rotate a number of times corresponding to a predetermined number of pulses and becomes stationary when the leading end of the document sheet reaches a predetermined reference position (at a forward end of the contact glass member 7). Then, an exposing and scanning device of the copying apparatus is rendered operative to expose a photosensitive member to an optical image of the document sheet on the contact glass member 7. Upon completion of the exposing operation, the conveyor belt 8 is driven again to eject the document sheet from the exposing station (from its position on the contact glass member 7), and the sensor S5 determines whether or not the document sheet has been positively discharged from the exposing station in a predetermined period of time. When the document sheet is not determined to have been discharged in the predetermined period of time, the document feeder is rendered inoperative to avoid jamming of the document sheet. If it is sensed that the document sheet has been normally discharged from the exposing station, then the document sheet is held between the discharge rollers 9 and fed forwardly while the next following document sheet is picked up by the pickup belt 3 and fed from the feeding tray 2 to the contact glass member 7 in the same manner as described hereinabove by referring to the previously fed document sheet. Meanwhile, the document sheet fed forwardly by the discharge rollers 9 makes a U-turn in the path of its travel in the direction of an arrow in the FIGURE and reaches the gate 11 through the feed rollers 10.

When the document sheet is a type of which only one surface should be copied, the gate 11 moves to a phantom line position in the FIGURE; when it is a type of which both surfaces should be copied, the gate 11 moves to a solid line position. Thus, when only one surface of the document sheet is copied, the document sheet travels over the gate 11 to the intermediate rollers 14 and 15 of the feeder section and then it is returned by the return rollers 16 and 17 to the feeding tray 2 from its rearward end with the top surface of the document sheet facing downwardly, so that the document sheet is placed on the uppermost document sheet of the stack on the feeding tray 2 (strictly speaking, on the job sheet).

When the document sheet is a type of which both sides are copied, it travels below the gate 11 in the solid line postion to be returned, with its top surface facing upwardly, by the inverted document sheet release rollers 12 and 13 to the feeding tray 2 from its forward end, so that the document sheet is placed on the uppermost document sheet of the stack on the feeding tray 2.

After the document sheet has passed through the gate 11, the sensor S6 or S7 senses whether the document sheet has been positively released on to the feeding tray 2 in a predetermined period of time. If the control unit was initially set for handling document sheets each having an image on either side, copy sheets produced are not ejected from the copying apparatus. When they bear transferprinted images only on one side, they are ejected on to an intermediate tray of the copying apparatus.

By repeatedly performing the aforesaid operation, the document sheets are returned one after another to the feeding tray 2 after passing through the exposing station until the job sheet moves to the position of the lowermost document sheet of the stack on the feeding tray 2. Then, the job sheet is sensed by the sensor S1 which produces a signal indicating that all the document sheets of the series have been treated for one exposure for each document sheet, showing that an operation for producing one copy of the original has been finished. The signal produced by the sensor S1 actuates a stapler, not shown, to bind copy sheets. Then, the document sheets are fed again from the feeding tray 2. When the sensor S1 has sensed the job sheet a predetermined number of times set beforehand in the control unit, the document feeder is rendered inoperative.

By using a job sheet in place of the partition plate of the prior art, it is possible to eliminate the need to use a mechanism of complex construction used in the prior art for withdrawing partition plate. Moreover, the job sheet not only performs the function which is performed in the prior art by the partition plate but also performs the function of controlling the operation of not only the document feeder but also the main body of the copying apparatus by bearing a code or mark on its surface for indicating whether only one side or both sides of each document sheet should be copied and what the desired number of copies of an original to be produced is. The job sheet is place on the feeding tray 2 beneath the lowermost document sheet of the stack of document sheets, and picked up by the pickup belt 3 ahead of the lowermost document sheet when an operation start command is given. The sensor S1 senses the job sheet and the mark on the job sheet is read by the sensor S3 or S4 or by a read-out sensor additionally arranged in the position in which the sensor S4 is located. The sensor reading the mark produces a signal which is supplied to and stored in the control unit of the document feeder and the main body of the copying apparatus to control the document feeder and the main body of the copying appratus. This eliminates the need to provide the document feeder with a manually operable input device, such as a ten-key device or a dial, for controlling the document feeder.

The mark on the job sheet is read only when the job sheet has been sensed by the sensor S1, so that information contained in a document sheet will never be mistaken for the mark for control.

What is claimed is:

1. An automatic document feeder for an electrophotographic copying apparatus having a feeding tray for receiving a stack of document sheets with the first document sheet in a series to be copies being initially the lowermost sheet of the stack, feeding means for feeding to an exposing station one document sheet after another from the stack on the feeding tray starting with the lowermost document sheet, and returning means for returning the document sheets to the feeding tray and replacing the same as the uppermost document sheet on the feeding tray after they have been eposed at the exposing station,
   wherein the improvement comprises:
   a job sheet placed beneath the initial lowermost document sheet of the stack on the feeding tray and being the same size as the document sheets and having a sensed indicia portion thereon for distinguishing the job sheet from the document sheets and a control indicia portion for controlling a further operation of the document feeder and the copying apparatus;

sensing means located in a lower part of the feeding tray on which the stack of document sheets and the job sheet are placed for sensing the indicia portion of the job sheet; and reading means located between the feeding means and the returning means for reading the control indicia portion on the job sheet;

whereby said sensed indicia portion of said job sheet is sensed by said sensing means when it has been returned to the feeding tray and becomes located beneath the lowermost document sheet on the lower part of the feeding tray to thereby indicate completion of one series of copying, and said control indicia portion is read by said reading means to control a further operation of said document feeder and copying apparatus only when said sensed indicia portion is sensed by said sensing means.

2. The automatic document feeder of claim 1, wherein said job sheet includes a two-sided copying control indicia thereon, and said returning means includes a gate located on the path of travel of the document sheets for directing the sheets along a path for returning the sheets inverted on the feeding tray when said reading means detects said two-sided copying control indicia.

* * * * *